(12) United States Patent
Shiraishi

(10) Patent No.: US 8,265,297 B2
(45) Date of Patent: Sep. 11, 2012

(54) SOUND REPRODUCING DEVICE AND SOUND REPRODUCTION METHOD FOR ECHO CANCELLING AND NOISE REDUCTION

(75) Inventor: Goro Shiraishi, Tokyo (JP)

(73) Assignee: Sony Corporation, Tokyo (JP)

( * ) Notice: Subject to any disclaimer, the term of this patent is extended or adjusted under 35 U.S.C. 154(b) by 1192 days.

(21) Appl. No.: 12/053,891

(22) Filed: Mar. 24, 2008

(65) Prior Publication Data

US 2008/0240465 A1    Oct. 2, 2008

(30) Foreign Application Priority Data

Mar. 27, 2007    (JP) ................................ 2007-082651

(51) Int. Cl.
*H04B 15/00* (2006.01)
(52) U.S. Cl. ...................................... 381/94.7; 381/71.8
(58) Field of Classification Search .................... 381/92, 381/94, 94.1–94.7, 71.8
See application file for complete search history.

(56) References Cited

U.S. PATENT DOCUMENTS

| | | | |
|---|---|---|---|
| 5,091,954 A | 2/1992 | Sasaki et al. | |
| 5,276,740 A | 1/1994 | Inanaga et al. | |
| 7,110,800 B2 * | 9/2006 | Nagayasu et al. | 455/575.2 |
| 7,860,134 B2 * | 12/2010 | Spence et al. | 370/536 |
| 2004/0057586 A1 * | 3/2004 | Licht | 381/94.7 |
| 2005/0031097 A1 * | 2/2005 | Rabenko et al. | 379/93.31 |
| 2005/0232436 A1 * | 10/2005 | Nagayasu et al. | 381/74 |
| 2008/0052074 A1 * | 2/2008 | Gopinath et al. | 704/256 |
| 2008/0215651 A1 * | 9/2008 | Sawada et al. | 708/205 |
| 2009/0010451 A1 * | 1/2009 | Burnett | 381/92 |
| 2009/0055170 A1 * | 2/2009 | Nagahama | 704/226 |
| 2009/0089054 A1 * | 4/2009 | Wang et al. | 704/233 |
| 2009/0111507 A1 * | 4/2009 | Chen | 455/550.1 |
| 2009/0147965 A1 * | 6/2009 | Kuo | 381/71.6 |
| 2009/0154717 A1 * | 6/2009 | Hoshuyama | 381/66 |
| 2011/0243127 A1 * | 10/2011 | Li et al. | 370/352 |

FOREIGN PATENT DOCUMENTS

| | | |
|---|---|---|
| JP | 2-231899 | 9/1990 |
| JP | 3-96199 | 4/1991 |
| JP | 3-214892 | 9/1991 |
| JP | 5-14475 | 1/1993 |
| JP | 8-340590 | 12/1996 |
| JP | 2001-136239 | 5/2001 |
| JP | 2003-198719 | 7/2003 |

OTHER PUBLICATIONS

Office Action issued Jun. 7, 2011, in Japanese Patent Application No. 2007-082651.

* cited by examiner

*Primary Examiner* — Nathan Ha
(74) *Attorney, Agent, or Firm* — Oblon, Spivak, McClelland, Maier & Neustadt, L.L.P.

(57) ABSTRACT

A sound reproducing device is provided including a communication unit that transmits/receives signals; at least one sound output unit that outputs sound based upon a signal having been received, a sound pickup unit that picks up sound and generates audio data, an echo canceller unit that stores any echo signal contained in the signal having been received at the communication unit and generates a dummy echo signal by using the stored echo signal, and a noise reducing unit that generates a cancel signal to be used to cancel noise by using the audio data if the sound picked up at the sound pickup unit contains noise originating from a noise source and outputs a composite signal generated by combining the output signal from the echo canceller unit and the cancel signal.

9 Claims, 8 Drawing Sheets

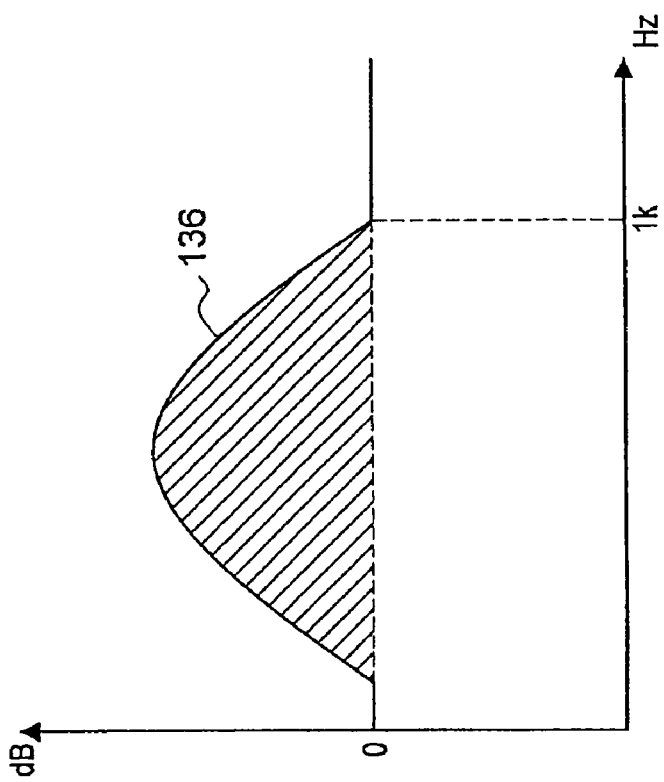
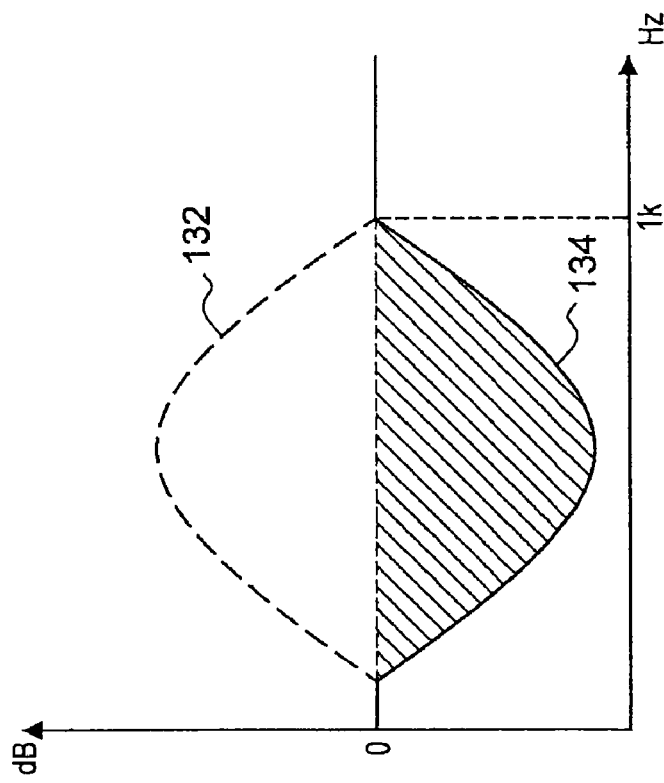
FIG.7A
FIG.7B

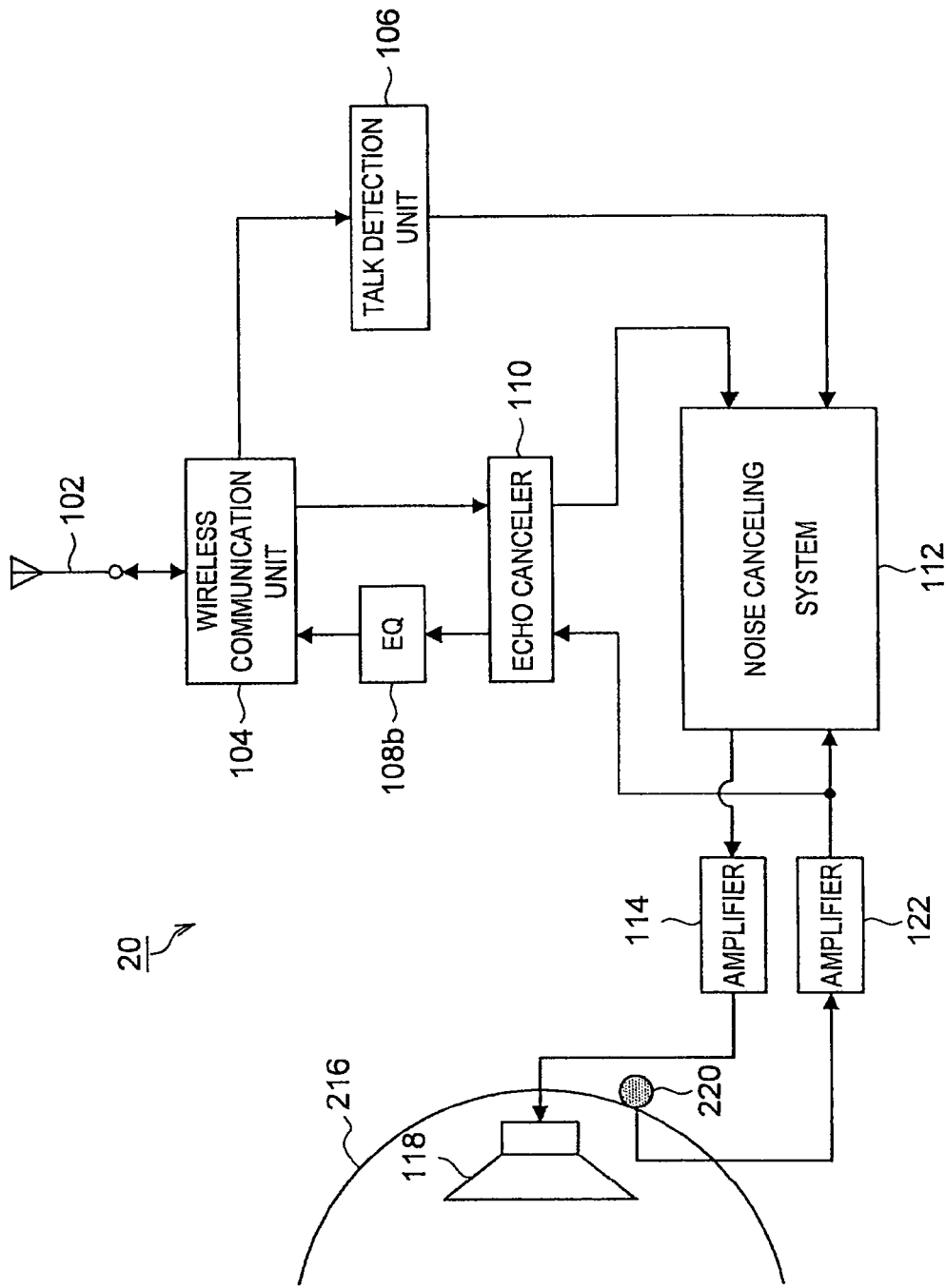

SOUND REPRODUCING DEVICE AND SOUND REPRODUCTION METHOD FOR ECHO CANCELLING AND NOISE REDUCTION

CROSS REFERENCE TO RELATED APPLICATION

The present invention contains subject matter related to Japanese Patent Application JP 2007-082651 filed in the Japan Patent Office on Mar. 27, 2007 the entire contents of which being incorporated herein.

BACKGROUND OF THE INVENTION

1. Field of the Invention

The present invention relates to a sound reproducing device and a sound reproduction method and more specifically, it relates to a sound reproducing device and a sound reproduction method that allow noise-free audio signals to reach the other party and also allow the user to listen to sound with ease by reducing the level of ambient noise.

2. Description of the Related Art

There are sound reproducing devices used to exchange audio signals through wireless connection or wired connection. Such a sound reproducing device has an audio signal transmission/reception function so that the user is able to exchange audio signals with another party at a remote location.

In order to ensure that noise-free audio signals reach the other party, a noise reducer is installed in the sound reproducing device, which reduces noise contained in sound after picking up the sound and the audio signals are thus transmitted to the other party via this means. Such technologies are disclosed in, for instance, Japanese Laid Open Patent Publication No. H2-231899.

SUMMARY OF THE INVENTION

There is an issue to be addressed in sound reproducing devices used for audio exchange in the related art in that since the noise reducing system is installed only on the audio input side, it will be difficult to hear sound transmitted from the other party, i.e., the communication partner speaking in a noisy environment. In addition, the conversation carried out with the communication partner speaking in a noisy environment tends to become louder due to the difficulty in understanding the other party's speech, which may become a public irritant.

Accordingly, the present invention, having been completed by addressing the issues discussed above, provides a new and improved sound reproducing device and a new and improved sound reproduction method that enable transmission/reception of sound with reduced noise by installing a noise reducer on the audio input side and also by reducing the noise level on the audio output side.

According to an embodiment of the present invention, there is provided a sound reproducing device comprising a communication unit that transmits/receives signals, at least one sound output unit that outputs sound based upon a signal having been received at the communication unit, a sound pickup unit that picks up sound and generates audio data, an echo canceller unit that stores any echo signal contained in the signal having been received at the communication unit and generates a dummy echo signal by using the stored echo signal, and a noise reducing unit that generates a cancel signal to be used to cancel noise by using the audio data if the sound picked up at the sound pickup unit contains noise originating from a noise source and outputs a composite signal generated by combining an output signal from the echo canceller unit and the cancel signal.

The structure described above includes a communication unit that transmits/receives signals, a sound output unit that outputs sound based upon a signal having been received at the communication unit, a sound pickup unit that picks up sound and generates audio data, an echo canceller unit that stores any echo signal contained in the signal having been received at the communication unit and generates a dummy echo signal by using the stored echo signal and a noise reducing unit that generates a cancel signal to be used to cancel noise by using the audio data if the sound picked up at the sound pickup unit contains noise originating from a noise source and outputs a composite signal generated by combining the output signal from the echo canceller unit and the cancel signal. In other words, the sound reproducing device, which includes the noise reducer installed on the audio input side, also reduces noise on the audio output side and thus, is capable of transmitting and receiving sound with reduced noise.

The sound reproducing device may further comprise a talk detection unit that detects a talk start. The talk detection unit may output a specific signal to the noise reducing unit upon detecting a talk start, and the noise reducing unit, in turn, may generate the cancel signal by limiting the band in response to the specific input signal from the talk detection unit. The talk detection unit included in the structure outputs a specific signal to the noise reducing unit upon detecting a talk start and the noise reducing unit generates the cancel signal by limiting the band in response to the specific input signal from the talk detection unit. Since it can be ensured that the sound band is not canceled out by restricting the band when generating the cancel signal upon detecting a talk start, easy conversation with a communication partner is assured without lowering the sound level of the other party's voice along with the ambient noise.

The sound reproducing device may further comprise a first equalizer that takes in an output from the communication unit, executes equalization processing on a specific frequency band and outputs data resulting from the equalization processing to the echo canceller unit. The first equalizer, which may be included in the sound reproducing device executes equalization processing on a specific frequency band and outputs the data resulting from the equalization processing to the echo canceller unit. Thus, even though the noise is eliminated via the noise reducing unit, the waveform of sound that should be heard by the user of the sound reproducing device can be sustained.

The sound reproducing device may further comprise a second equalizer that takes in the output from the echo canceller unit, cuts off the low frequency band and outputs a signal obtained by cutting off the low frequency band to the communication unit. The second equalizer in this sound reproducing device cuts off the low frequency band before outputting the signal to the communication unit. Since the low frequency portion is cut off, noise in the low frequency portion is not passed on to the communication partner.

The sound reproducing device may further comprise a housing that encloses the sound output unit and, in such case, the sound pickup unit may be installed within the housing. In this structure, the sound pickup unit is installed within the housing enclosing the sound output unit. As a result, noise output from a noise source and sound output from the sound output unit are picked up at the sound pickup unit, enabling the noise reducing unit to generate a cancel signal to be used to cancel out the noise reaching inside the housing.

The sound reproducing device may further comprise a housing that encloses the sound output unit and the sound pickup unit may be installed outside the housing. In this structure, the sound pickup unit is installed outside the housing encasing the sound output unit. As the sound pickup unit picks up noise from a noise source, the noise reducing unit is able to generate a cancel signal to be used to cancel the noise reaching the inside of the housing.

The sound reproducing device may further comprise a bone-conducted sound pickup unit that picks up bone-conducted sound conducted through bone conduction. In this case, the bone-conducted sound pickup unit included in the sound reproducing device will pick up bone-conducted sound conducted through bone conduction. Such a sound reproducing device is able to convert vocal cord vibration conducted through bone to an audio signal.

The sound reproducing device may include a single sound output unit. The user of such a sound reproducing device will be able to listen to the voice of the communication partner with one ear.

According to another embodiment of the present invention, there is provided a sound reproduction method comprising a communication step in which signals are transmitted/received, a sound output step in which sound is output based upon a received signal having been received in the communication step, a dummy echo signal generation step in which any echo signal contained in the signal having been received in the communication step is stored and a dummy echo signal, to be used to prevent the echo signal from returning to the transmission side by attenuating the echo signal, is generated based upon the stored echo signal, a sound pickup step in which sound is picked up and audio data are generated and a cancel signal generation step in which a cancel signal to be used to cancel any noise originating from a noise source and contained in the sound having been picked up in the sound pickup step is generated by using the audio data.

The sound reproduction method described above includes a communication step in which signals are transmitted/received, a sound output step in which sound is output based upon a received signal having been received in the communication step, the dummy echo signal generation step in which any echo signal contained in the signal having been received in the communication step is stored and a dummy echo signal, to be used to prevent the echo signal from returning to the transmission side by attenuating the echo signal is generated based upon the stored echo signal, a sound pickup step in which sound is picked up and audio data are generated and a cancel signal generation step in which a cancel signal to be used to cancel any noise contained in originating from a noise source and contained in the sound having been picked up in a sound pickup step is generated by using the audio data. Through this method, noise contained in input audio is reduced and noise originating from a noise source that would otherwise reach the ear listening to the sound being output is reduced, enabling transmission/reception of sound with reduced noise.

According to the embodiments of the present invention described above, a new and improved sound reproducing device and a new and improved sound reproduction method, which enable transmission/reception of sound with reduced noise by installing a noise reducer on the audio input side and also reducing noise on the audio output side, are provided.

BRIEF DESCRIPTION OF THE DRAWINGS

FIGS. 7A and 7B schematically illustrate the equalization processing executed in the first embodiment of the present invention; and FIG. 8 shows the structure adopted in the sound reproducing sound reproducing device 20 achieved in a second embodiment of the present invention.

DETAILED DESCRIPTION OF THE PREFERRED EMBODIMENTS

Figure 1:
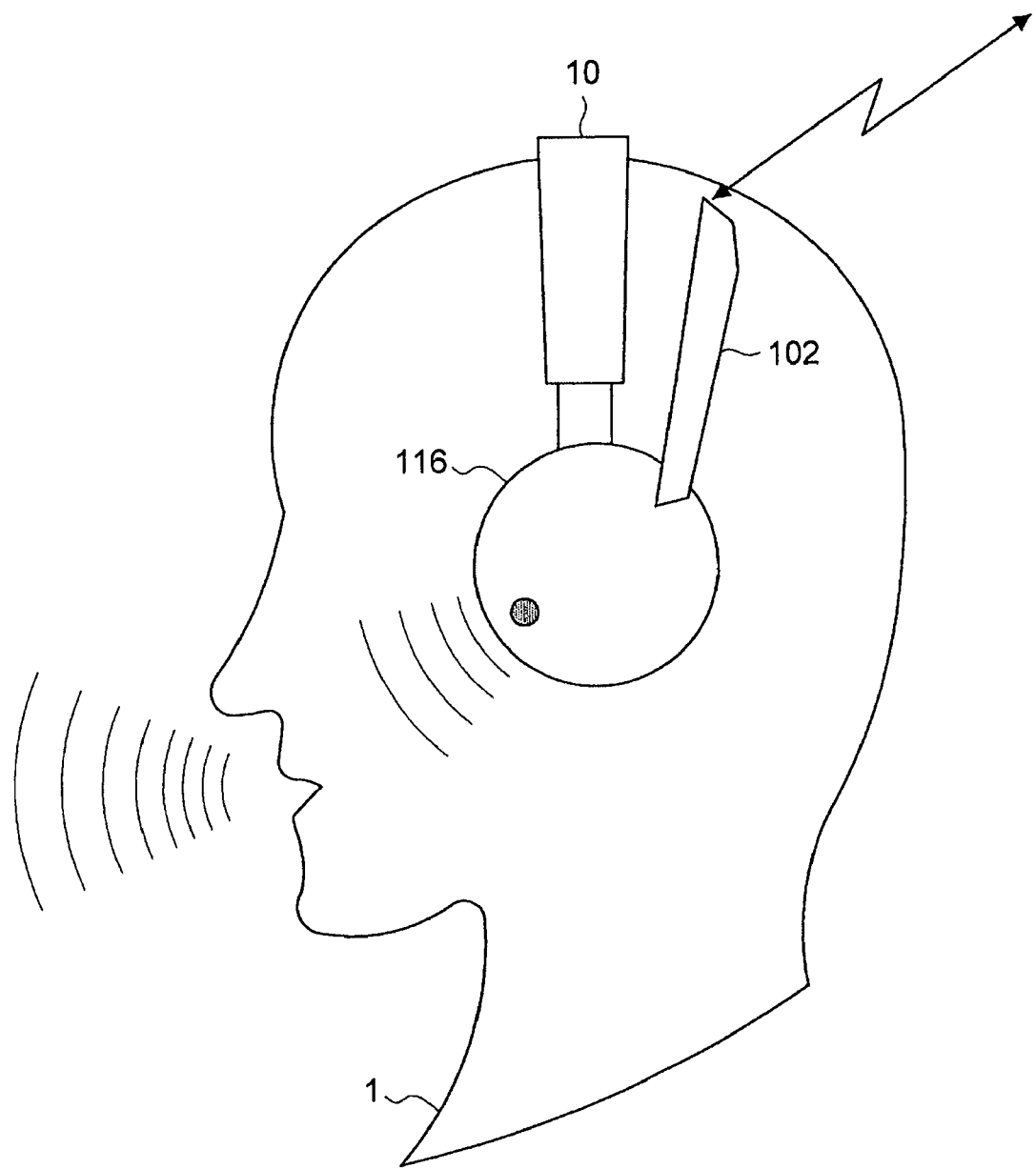
FIG. 1 schematically illustrates the sound reproducing device 10 achieved in a first embodiment of the present invention.

Hereinafter, preferred embodiments of the present invention will be described in detail with reference to the appended drawings. Note that, in this specification and the appended drawings, structural elements that have substantially the same functions and structures are denoted with the same reference numerals, and repeated explanation of these structural elements is omitted.

First Embodiment

First, the sound reproducing device and the sound reproduction method achieved in the first embodiment of the present invention are described.

FIG. 1 presents a schematic illustration of the sound reproducing device 10 achieved in the first embodiment of the present invention. The sound reproducing device 10 shown in FIG. 1 is worn on the head of a user 1. The following is an overview of the sound reproducing device 10 achieved in the first embodiment of the present invention, given in reference to FIG. 1.

The sound reproducing device 10 is used to wirelessly exchange audio data with the communication partner via an antenna 102 or reproduce music. Audio data transmitted from the communication partner are received at the antenna 102, then undergo data processing inside the sound reproducing device 10 and are output as sound through a speaker installed within a housing 116.

The voice of the user 1, on the other hand, is picked up by a microphone installed within the housing 116, the sound having been picked up undergoes data processing inside the sound reproducing device 10 to generate audio data and the audio data are wirelessly transmitted to the communication partner from the antenna 102.

As described above, the user is able to carry out a conversation with a communication partner via the antenna 102 and the microphone installed within the housing 116. However, the sound reproducing device 10 is often used in an environment where noise originating from a noise source is present. Such a noisy environment may be, for instance, a busy street or in a crowded shop. When carrying out a conversation via the sound reproducing device in a noisy environment, the following challenges must be overcome. Namely, the speech of the communication partner cannot be understood with ease due to the noise and also noise overriding the voice of the user 1 makes it difficult for the communication partner to understand the speech of the user 1.

Accordingly, the sound reproducing device and the sound reproduction method achieved in the first embodiment of the present invention to be described in detail below allow conversation with the communication partner to be carried out smoothly by reducing the noise mixed in with the voice of the user as well as the noise contained in the sound originating from the communication partner.

It will be obvious that while the sound reproducing device 10 in FIG. 1 is worn on the head of the user 1, the sound reproducing device 10 may assume a structure other than that shown in FIG. 1.

Figure 2:
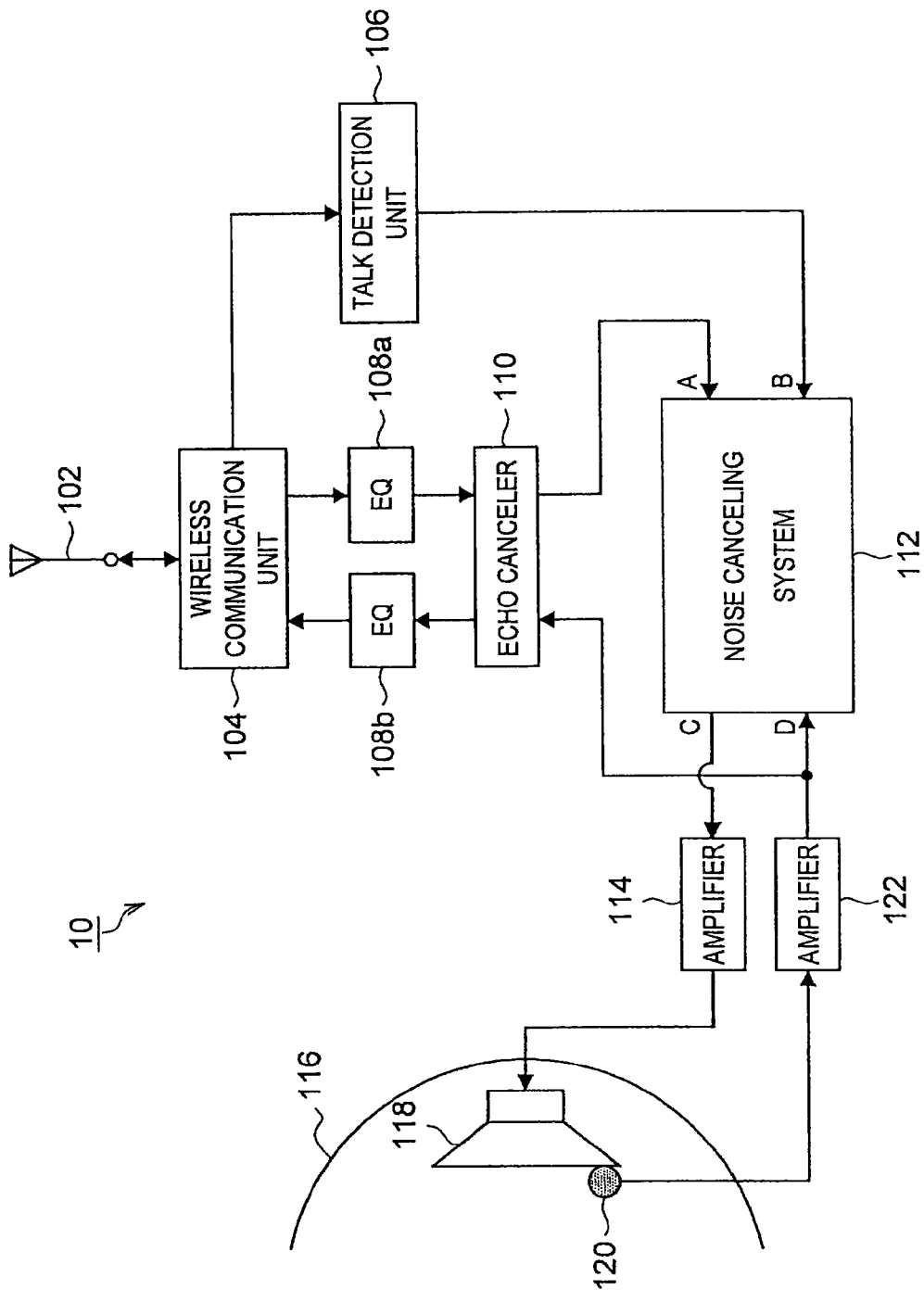
FIG. 2 shows the structure adopted in the sound reproducing device 10 in the first embodiment of the present invention.

Next, the structure of the sound reproducing device 10 in the first embodiment of the present invention having been outlined above in reference to FIG. 2 is described.

FIG. 2 shows the structure adopted in the sound reproducing device 10 in the first embodiment of the present invention. The following is an explanation of the structure of the sound reproducing device 10 in the first embodiment of the present invention, given in reference to FIG. 2.

As shown in FIG. 2, the sound reproducing device 10 in the first embodiment of the present invention comprises the antenna 102, a wireless communication unit 104, a talk detection unit 106, equalizers (EQ) 108a and 108b, an echo canceller 110, a noise canceling system 112, a first amplifier 114, the housing 116 and a second amplifier 122. A speaker 118 and a microphone 120 are installed at the housing 116.

Radio waves are transmitted/received via the antenna 102. A radio wave transmission/reception is executed as a radio wave is transmitted via the antenna 102 or as a radio wave having been transmitted is received at the antenna 102. Voice dialogue with the communication partner can be carried out through such radio wave transmission/reception. A radio wave received at the antenna 102 is input to the wireless communication unit 104.

The wireless communication unit 104 generates audio data of the communication partner's speech by demodulating the radio wave received at the antenna 102 and also generates a radio wave to be transmitted via the antenna 102 by modulating the audio data of the speech by the user 1 of the sound reproducing device 10. It is to be noted that while audio data are transmitted/received wirelessly in the embodiment, the present invention is not limited to this example and audio data may be exchanged through wired connection.

In addition, the type of radio wave decode processing executed by the wireless communication unit 104 is determined in correspondence to the communication protocol in compliance with which sound reproducing devices 10 communicate and is not limited to any specific type of decode processing. In other words, it is a design matter that can be determined arbitrarily.

The talk detection unit 106 detects a start of conversation to be carried on via the sound reproducing device 10. As a radio wave from the communication partner is received at the antenna 102 while no conversation is in progress and the radio wave having been received is demodulated at the wireless communication unit 104, the talk detection unit 106 detects a talk start and outputs a specific signal. In the embodiment, the talk detection unit 106 having detected a talk start transmits a signal to the noise canceling system 112 to notify the noise canceling system 112 of a talk start. The talk detection unit 106 simply needs to be able to output a signal corresponding to a specific input signal and may be constituted with, for instance, a circuit that outputs a specific signal in response to a signal input at a predetermined level. The operation of the talk detection unit 106 is to be described in detail later.

The equalizer 108a, representing an example of the first equalizer according to the present invention, alters the frequency characteristics of the audio data having been received at the antenna 102 and having been modulated at the wireless communication unit 104 over a specific frequency range and inputs the altered audio data to the echo canceller 110. Since the frequency characteristics over the specific frequency range are altered via the equalizer 108a, the waveform of the sound reaching the ear of the user 1 must be relatively intact even if the noise is removed through the noise canceling system 112.

Likewise, the equalizer 108b, representing an example of the second equalizer according to the present invention, alters the frequency characteristics of the audio data of the speech by the user 1 output from the echo canceller 110 over a specific frequency range and inputs the altered audio data to the wireless communication unit 104. The frequency characteristics altered via the equalizers 108a and 108b are to be described in detail later.

The echo canceller 110 stores any echo signal contained in the audio data received at the wireless communication unit 104 and generates a dummy echo signal to be used to prevent the echo signal from returning to the transmission side by attenuating the echo signal through subtraction of the stored echo signal. The operational principle of the echo canceller 110 is now briefly explained. Although not shown, an adaptive filter is installed within the echo canceller 110, which executes convolution operation on the signal received from the communication partner by using the adaptive filter. Through the convolution operation, the echo canceller 110 generates the dummy echo signal used to prevent transmission of the echo signal toward the other party.

In the embodiment, if an echo signal is contained in the audio signal input from the equalizer 108a, the echo signal is first stored and then the stored echo signal is subtracted from the audio signal input from the second amplifier 122. As the echo signal is eliminated at the echo canceller 110, the part of the received audio signal, i.e., the echo signal component, which would otherwise be introduced into the transmission audio signal being transmitted, can be removed, and thus, the audio quality is not compromised.

The noise canceling system 112 represents an example of the noise reducing unit according to the present invention. If any noise originating from a noise source is contained in the sound picked up by the microphone 120, the noise canceling system 112 generates a cancel signal to be used to cancel the noise and combines the cancel signal thus generated with the output signal from the microphone 120 so as to reduce the noise in the sound output from the speaker 118. The output signal from the noise canceling system 112 is input to the first amplifier 114. The cancel signal generated by the noise canceling system 112 is to be described in detail later.

The first amplifier 114 takes in the output signal from the noise canceling system 112 and amplifies it with a given amplification factor and outputs the amplified signal. The extent by which the signal is amplified at the first amplifier 114 is a design matter that can be set freely in correspondence to the characteristics of the speaker 118, and the present invention is not limited to any specific amplification factor. The signal having been amplified at the first amplifier 114 is then input to the speaker 118.

Based upon the signal input from the first amplifier 114, the speaker 118 causes vibration of a built-in diaphragm (not shown) and thereby outputs sound. The microphone 120 represents an example of the sound pickup unit according to the present invention. The microphone 120 picks up sound output through the speaker 118 and sound made through the mouth of the user 1, converts the sound it has picked up to audio data and inputs the audio data resulting from the conversion to the second amplifier 122.

The second amplifier 122 takes in the audio data of the sound having been picked up at the microphone 120, amplifies the audio data at a given amplification factor and outputs the amplified signal. The extent to which the audio data are amplified at the second amplifier 120 is a design matter and is not limited to any specific amplification factor. The signal, having been amplified at the second amplifier 122 is then input to the echo canceller 110 and the noise canceling system 112.

The structure of the noise canceling system 112 in the sound reproducing device 10 achieved in the first embodiment of the present invention, the structure of which has been described in reference to FIG. 2, is now explained.

Figure 3:
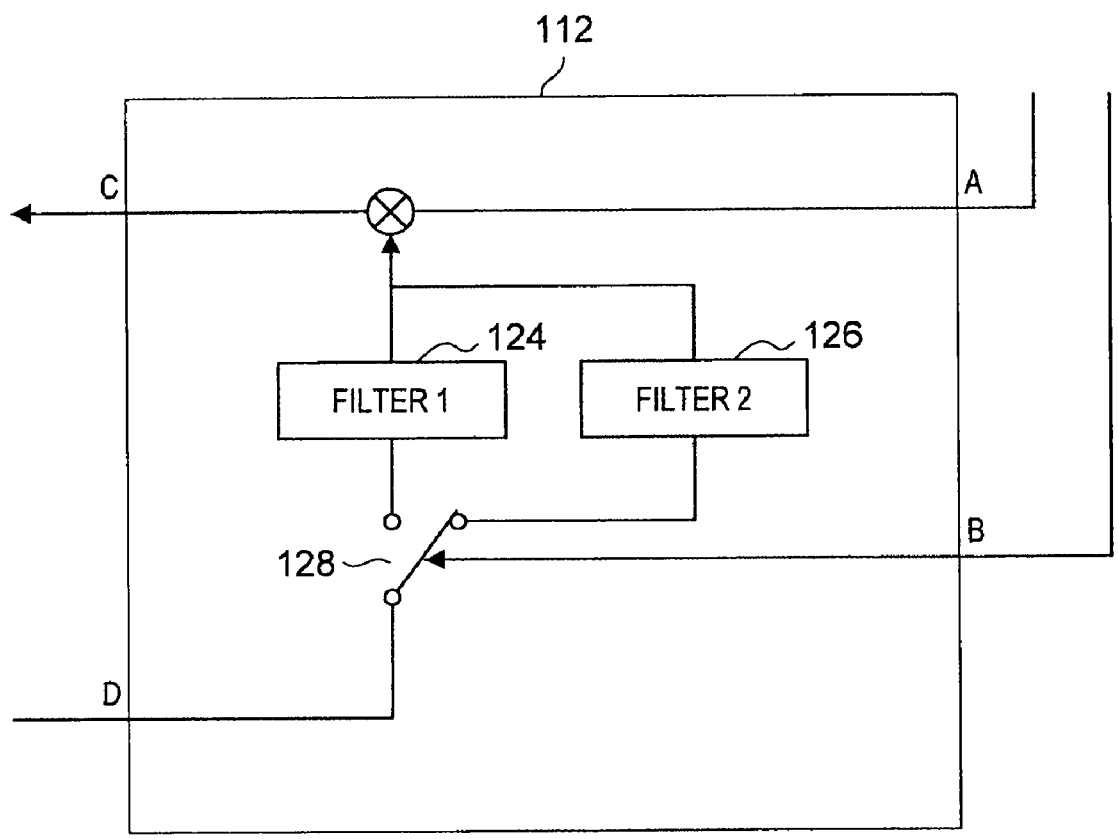
FIG. 3 shows the structure adopted in the noise canceling system 112 in the first embodiment of the present invention.

FIG. 3 shows the structure adopted in the noise canceling system 112 in the first embodiment of the present invention. The following is an explanation of the structure of the noise canceling system 112 in the first embodiment of the present invention, given in reference to FIG. 3.

As shown in FIG. 3, the noise canceling system 112 achieved in the first embodiment of the present invention includes a first filter 124, a second filter 126 and a switch 128.

The first filter 124 and the second filter 126 each generate and output a cancel signal to be used for audio data noise cancellation by inverting the phase of the audio data having been picked up at the microphone 120 and amplified at the second amplifier 122. The first filter 124 and the second filter 126 are different from each other in that while the first filter 124 generates a cancel signal for the entire frequency band, the second filter 126 generates a cancel signal for the frequency range that does not include the frequency range of the human voice.

Figure 4:
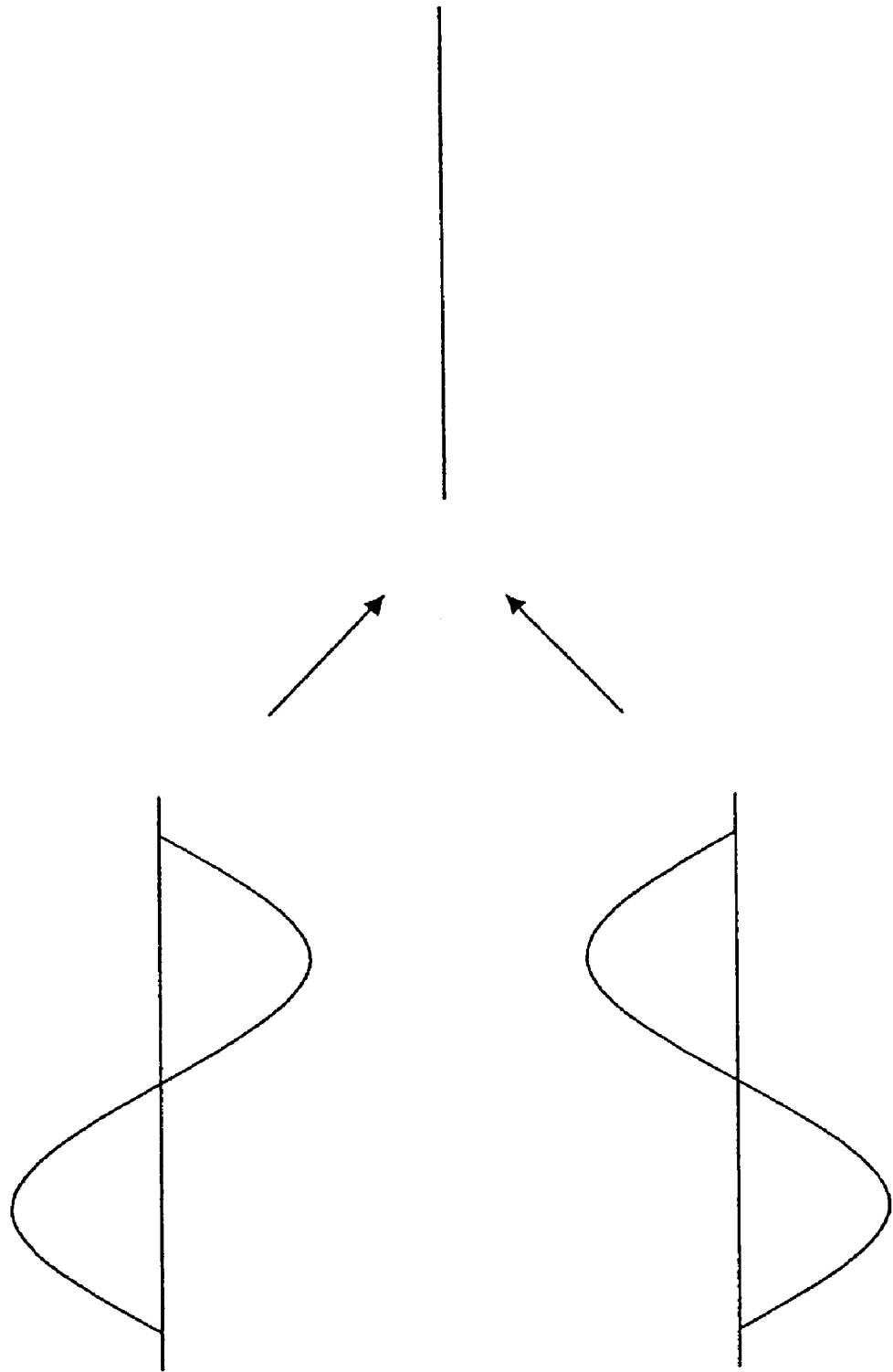
FIG. 4 schematically illustrates how noise may be reduced by a noise canceling system.

FIG. 4 schematically illustrates how noise is reduced via the noise canceling system. Upper left of FIG. 4 schematically indicates the frequency characteristics of noise originating from a noise source. When such noise has been imparted from the noise source, a signal with a phase inverted with respect to that of the noise, to be used to cancel the noise, is generated as shown in lower left of FIG. 4. Then, by integrating the waveform in upper left of FIG. 4 with the waveform in lower left of FIG. 4, a flat waveform such as that shown in right of FIG. 4 is obtained, thereby canceling out the noise.

The switch 128 is used to switch from the first filter 124 to the second filter 126 and vice versa. A changeover at the switch 128 occurs in response to an output signal from the talk detection unit 104 shown in FIG. 2. Under normal circumstances, the switch 128 is connected to the first filter 124 so as to cancel out noise. As noise is picked up at the microphone 120 and audio data containing the noise are input to the first filter 124, the first filter 124 generates and outputs a signal assuming an inverted phase to be used to cancel out the noise.

The talk detection unit 106 sends out a signal to the switch 128 upon detecting a talk start. In response to the signal received from the talk detection unit 106, the switch 128 switches its connection, from the first filter 124 to the second filter 126. If noise is picked up at the microphone 120 and audio data containing the noise are input to the second filter 126 in this state, the second filter 126 generates and outputs a cancel signal to be used to cancel out the noise in the frequency range other than the voice frequency range.

As the optimal filter to output the cancel signal is selected through filter changeover at the start of a conversation between sound reproducing devices 10, the voice band is not canceled and thus, the talk can be carried out with ease without the sound level of the speech of the other party becoming lower along with the level of the noise.

The method adopted for sound reproduction in the sound reproducing device 10 in the first embodiment of the present invention, the structure of the noise canceling system 112 which has been explained in reference to FIG. 3, is now described.

Figure 5:
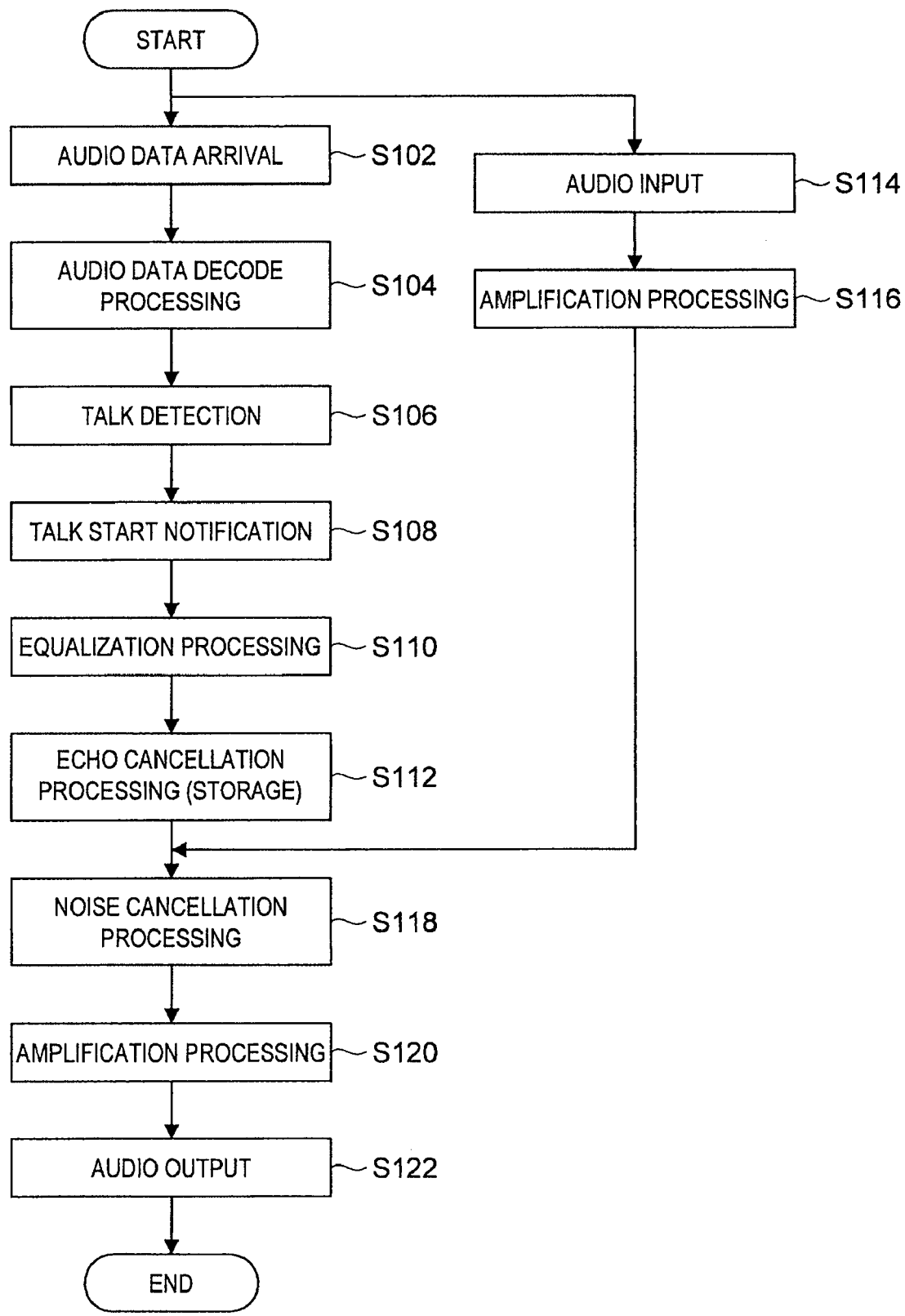
FIG. 5 presents a flowchart of sound reproduction executed by using the sound reproducing device 10 achieved in the first embodiment of the present invention.
Figure 6:
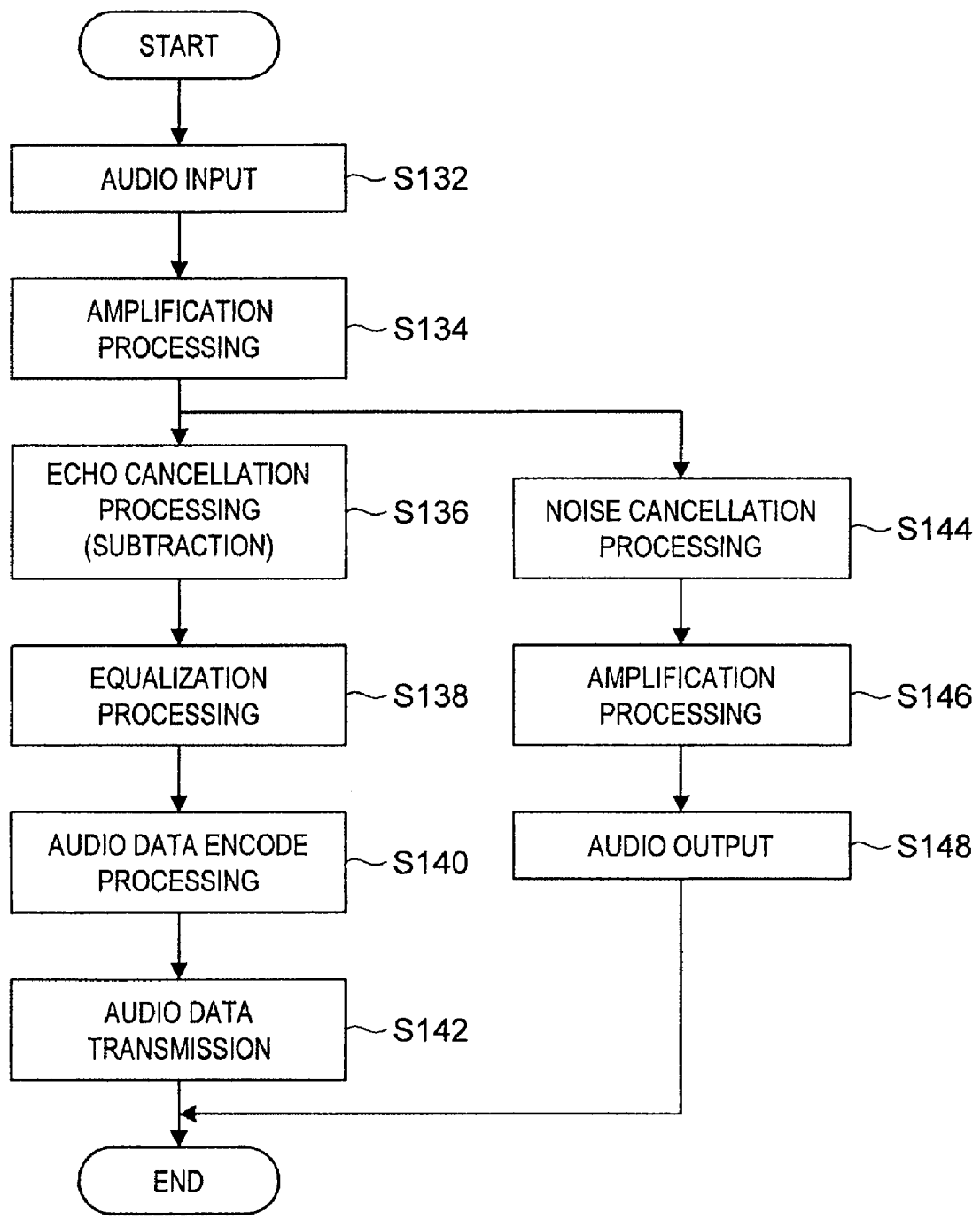
FIG. 6 presents a flowchart of sound reproduction executed by using the sound reproducing device 10 achieved in the first embodiment of the present invention.

FIGS. 5 and 6 each present a flowchart of the sound reproduction executed by using the sound reproducing device 10 in the first embodiment of the present invention. The sound reproduction method implemented by using the sound reproducing device 10 in the first embodiment of the present invention is explained below in reference to FIGS. 5 and 6.

FIG. 5 presents a flowchart of the operation executed as initial audio data from the communication partner reach the subject sound reproducing device following the start of a conversation between sound reproduction devices 10. As the conversation between the sound reproducing devices 10 starts, audio data, carried on a radio wave, reach the antenna 102 (step S102). The radio wave received at the antenna 102 undergoes decode processing at the wireless communication unit 104 and through the decode processing, the audio data are extracted (step S104). As explained earlier, the type of radio wave decode processing executed by the wireless communication unit 104 is determined in correspondence to the communication protocol in compliance with which the sound reproducing devices 10 communicate and is not limited to any specific type of decode processing. In other words, it is a design matter that can be determined arbitrarily.

Once the audio data are extracted, the talk detection unit 106 detects the start of conversation (step S106). Upon detecting the talk start, the talk detection unit 106 notifies the noise canceling system 112 of the talk start (step S108). As explained earlier, upon receiving the talk start notification from the talk detection unit 106, the noise canceling system 112 switches to the second filter so as to generate a cancel signal for the frequency band that does not include the frequency band of the human voice. Concurrently as the talk start notification is issued by the talk detection unit 106, the equalizer 108a executes equalization processing on the received audio data (step S110).

FIGS. 7A and 7B schematically illustrate the equalization processing executed in the first embodiment of the present invention. FIG. 7A schematically shows the waveform in the pre-equalization processing state, whereas FIG. 7B schematically illustrates the waveform resulting from the equalization processing.

Reference numeral 132 indicates the waveform of the audio data transmitted from the other sound reproducing device 10. The noise is removed at the noise canceling system 112 in the embodiment. This means that the sound reaches the ear of the user 1 with the noise removed from the waveform indicated by reference numeral 132. However, as the noise is removed, even sound in a frequency range as low as 1 kHz, which the user 1 should be able to hear easily, may reach the ear of the user 1 with its sound level reduced, as indicated by the waveform denoted with reference numeral 134.

Accordingly, the equalizer 108a executes equalization processing so as to achieve the waveform indicated by reference numeral 136 before the audio data are input to the noise canceling system 112, as shown in FIG. 7B. Through such equalization processing, the waveform of the sound that should be heard by the user 1 can be kept fairly intact even when the noise is removed via the noise canceling system 112.

After executing the equalization processing on the audio data having been received, the equalizer 108a inputs the audio data having undergone the equalization processing to the echo canceller 110. The echo canceller 110 makes a decision as to whether or not the audio data having been input contain an echo signal and if they contain an echo signal, it stores the echo signal. It then generates a dummy echo signal to be used to prevent the echo signal from returning to the transmission site by attenuating the echo signal based upon the stored echo signal (step S112).

If noise originating from the noise source is input to the microphone 120 (step S114), the second amplifier 122 executes amplification processing on the noise having been input to the microphone (step S116) and the amplified noise is input to the noise canceling system 112.

Once the dummy echo signal is generated by the echo canceller 110, the audio data are input from the echo canceller 110 to the noise canceling system 112. The noise canceling system 112 then executes noise cancellation processing in order to cancel the noise from the noise source having been input through the microphone 120 (step S118). In the noise cancellation processing executed by the noise canceling system 112, a cancel signal assuming a phase inverted with respect to the phase of the noise is generated, the cancel signal is added to the audio data having been input and the resulting sum is output.

The noise canceling system 112 may execute the noise cancellation processing only over a frequency range that does not include the frequency of voice instead of the entire frequency band of the audio data in response to the talk start notification issued by the talk detection unit 106. By executing the noise cancellation processing only over the limited frequency band excluding the voice frequency band, noise from the noise source can be selectively canceled without canceling the voice of the user 1 or the sound of the voice of the communication partner. Since this prevents the undesirable phenomena in which the user hears an echo of his voice, conversation can be carried out smoothly.

Upon completing the noise cancellation processing, the noise canceling system 112 provides its output signal to the first amplifier 114 where the output signal from the noise canceling system 112 undergoes amplification processing (step S120). The extent to which the signal is amplified at the first amplifier 114 is a design matter that can be adjusted in correspondence to the characteristics of the speaker 118 and is not restricted to any specific amplification factor, as explained earlier.

The signal having become amplified at the first amplifier 114 is an input to the speaker 118, which then outputs the sound (step S122). The signal output from the speaker 118 at this time is the sum of the audio data from the communication partner and the cancel signal generated to cancel the noise. Since the noise from the noise source is canceled in the audio signal output through the speaker 118 and sound with reduced noise reaches the gear of the user 1, the user is able to carry out a smooth conversation with the communication partner.

FIG. 6 presents a flowchart of the operation executed when the user 1, having heard sound originating from the communication partner, speaks in response and the sound originating from the mouth of the user 1 is transmitted to the communication partner. The user 1 having heard the sound originating from the communication partner inputs sound through the microphone 120 (step S132). The sound input to the microphone 120 at this time includes sound propagated through the body of the user 1 and sound reaching the microphone directly from the mouth of the user 1.

As the sound is input to the microphone 120, the microphone 120 generates a signal based upon the input sound and inputs the signal thus generated to the second amplifier 122.

The second amplifier 122 executes amplification processing to amplify the signal input from the microphone 120 by a specific extent (step S134). The extent to which the signal is amplified at the second amplifier 122 is a design matter and is not restricted to any specific amplification factor, as explained earlier.

The audio data signal having been amplified at the second amplifier 122 is input to the noise canceling system 112 and the echo canceller 110. The echo canceller 110 having taken in the audio data signal input from the second amplifier 122 executes the echo cancellation processing in order to attenuate the echo signal by combining the input audio data signal with the dummy echo signal having been generated in step S112 as explained earlier (step S136).

The audio data signal having undergone the echo cancellation processing at the echo canceller 110 is input to the equalizer 108b. The equalizer 108b executes equalization processing on the audio data input signal (step S138). Through the equalization processing executed at the equalizer 108b, the audio data signal is converted to sound easily audible to the communication partner by correcting its characteristics. The equalization processing may be executed at the equalizer 108b in combination with processing for cutting off a low-range frequency portion. By cutting off the low-range frequency portion, which is lower than the frequency range of the human voice via the equalizer 108b, it is ensured that low frequency noise in the noise originating from the noise source is not transmitted to the communication partner.

The audio data signal having undergone the equalization processing at the equalizer 108b is then input to the wireless communication unit 104. At the wireless communication unit 104, the audio data signal undergoes encode processing (step S140) and the encoded audio data signal is transmitted via the antenna 102 (step S142).

The noise canceling system 112 having taken in the audio data signal from the second amplifier 122 executes noise cancellation processing to generate a cancel signal to be used to cancel noise from the noise source contained in the input signal as explained earlier (step S144). The audio data having undergone the noise cancellation processing are then amplified at the first amplifier 114 (step S146). The amplified signal is input to the speaker 118 which then outputs the sound (step S148).

The sound reproduction method achieved by utilizing the sound reproducing device 10 in the first embodiment of the present invention has been described.

As has been explained, the microphone 120 is installed within the housing 116 and noise within the housing 116 is reduced via the noise canceling system 112 in the first embodiment of the present invention. Since this reduces the noise in the sound noise mixed in the audio data of the speech by the user as well as noise in the sound originating from the communication partner, the conversation with the communication partner can be carried out smoothly.

Second Embodiment

In reference to the first embodiment of the present invention, the sound reproducing device 10 and the sound reproduction method through which noise is reduced by installing a microphone 120 inside the housing 116, have been described. Now, a sound reproducing device and a sound reproduction method that reduce noise by installing a microphone outside the housing are described in reference to the second embodiment of the present invention.

FIG. 8 shows the structure adopted in the sound reproducing device 20 in the second embodiment of the present invention. The following is an explanation of the structure of the sound reproducing device 20 achieved in the second embodiment of the present invention, given in reference to FIG. 8.

As shown in FIG. 8, the sound reproducing device 20 achieved in the second embodiment of the present invention comprises an antenna 102, a wireless communication unit 104, a talk detection unit 106, an equalizer 108b, an echo canceller 110, a noise canceling system 112, a first amplifier 114, a housing 216 and a second amplifier 122.

A speaker 118 and a microphone 220 are installed at the housing 216.

The sound reproducing device 20 in FIG. 8 differs from the sound reproducing device 10 in FIG. 2 in that it does not include the equalizer 108a and that the microphone 220 is installed on the outside of the housing 216. Accordingly, the following explanation focuses on these differences.

The sound reproducing device 20 in FIG. 8 differs from the sound reproducing device 10 shown in FIG. 2 in that it does not include the equalizer 108a, which executes equalization processing on audio data from the communication partner. This absence of the equalizer 108a and the installation location of the microphone 220, i.e., on the outside of the housing 216, bear significant relevance to each other. Namely, unlike in the first embodiment, the microphone 220 in the embodiment picks up noise from a noise source and the voice originating from the mouth of the user 1, but not the sound originating from the communication partner, which is output through the speaker 118. Accordingly, the sound reproducing device 20 in the current embodiment achieves an advantage in that a noise signal that would cancel the sound from the communication partner is not generated through the noise cancellation processing executed at the noise canceling system 112.

Unlike the sound reproducing device 10 shown in FIG. 2, the sound reproducing device 20 includes the microphone 220 installed on the outside of the housing 216. In the first embodiment, the noise from the noise source and the sound originating from the communication partner are both picked up by the microphone 120 and the cancel signal to be used to cancel the noise is generated by inputting the sound thus picked up to the noise canceling system 112. In the current embodiment, on the other hand, only the noise from the noise source is picked up by the microphone 220 but the sound originating from the communication partner is not picked up by the microphone 220. Namely, the noise from the noise source is picked up by the microphone 220 in advance. The noise canceling system 112 generates a cancel signal by using the noise having been picked up and combines the cancel signal with the audio data transmitted from the communication partner, allowing the user 1 to hear sound with reduced noise.

The structure of the sound reproducing device 20 achieved in the second embodiment of the present invention has been explained in reference to FIG. 8.

As described above, the microphone 220 is installed on the outside of the housing 216 and noise within the housing 216 is reduced via the noise canceling system 112 in the second embodiment of the present invention. Since this reduces noise mixed in the speaking voice of the user as well as the noise in the audio data from the communication partner, the conversation with the communication partner can be carried out smoothly. In addition, the structure adopted in the second embodiment does not require an equalizer to execute equalization processing on the sound originating from the communication partner and, as a result, the voice of the communication partner heard by the user will sound more natural.

It will be understood by those skilled in the art that various modifications, combinations, sub-combinations and alterations may be made depending upon design requirements and other factors insofar as they remain within the scope of the appended claims or equivalent thereof.

For instance, while the microphone is installed either inside or outside the housing in the embodiments described above, the present invention is not limited to these examples. For instance, in addition to the microphone installed either inside or on the outside of the housing, another microphone for picking up bone-conducted sound may be installed. With the bone conduction microphone, the vibration of the vocal cords transmitted through bone can be converted to an audio signal.

In addition, while the illustrations of the embodiments include a single speaker, the present invention may be adopted in conjunction with two speakers. The user of a sound reproducing device equipped with a single speaker will listen to the sound originating from the communication partner with one ear, whereas the user of a sound reproducing device equipped with two speakers will listen to the sound originating from the communication partner with both ears.

Furthermore, while the sound reproducing device 10 in the embodiment directly exchanges audio data with the communication partner through wireless communication, the sound reproducing device according to the present invention is not limited to this example. For instance, it will be obvious that the present invention may also be adopted in a sound reproducing device that wirelessly exchanges audio data with the communication partner via a base station.

What is claimed is:

1. A sound reproducing device, comprising:
   a communication unit that transmits/receives signals;
   at least one sound output unit that outputs sound based upon a signal having been received at said communication unit;
   a sound pickup unit that picks up sound containing noise and generates audio data;
   an echo canceller unit that stores an echo signal contained in the signal received at said communication unit and generates a dummy echo signal to be used to prevent said echo signal from returning to a transmission side of said communication unit by attenuating said echo signal based upon said echo signal having been stored; and
   a noise reducing unit that generates a cancel signal to be used to cancel noise based upon said audio data of the sound having been picked up at said sound pickup unit and outputs a composite signal generated by combining said dummy echo signal and said cancel signal.

2. A sound reproducing device according to claim 1, further comprising:
   a talk detection unit that detects a talk start, wherein:
   if a talk start is detected by said talk detection unit, said noise reducing unit generates said cancel signal based upon said audio data over a predetermined band.

3. A sound reproducing device according to claim 1, further comprising:
   a first equalizer that executes equalization processing on the signal received at said communication unit over a predetermined frequency band, wherein:
   said echo canceller unit generates a dummy echo signal based upon the received signal having undergone said equalization processing.

4. A sound reproducing device according to claim 1, further comprising:
   a second equalizer that cuts off a low frequency band in said dummy echo signal, wherein:

said communication unit transmits a dummy echo signal obtained by cutting off the low frequency band.

5. A sound reproducing device according to claim 1, further comprising:

a housing that encloses said sound output unit, wherein:

said sound pickup unit is installed within said housing.

6. A sound reproducing device according to claim 1, further comprising:

a housing that encloses said sound output unit, wherein:

said sound pickup unit is installed outside said housing.

7. A sound reproducing device according to claim 1, further comprising:

a bone-conducted sound pickup unit that picks up bone-conducted sound conducted through bone conduction, wherein:

said communication unit transmits a composite signal generated by combining the bone-conducted sound and said dummy echo signal.

8. A sound reproducing device according to claim 1, equipped with:

a single sound output unit.

9. A sound reproducing device according to claim 1, wherein said communication unit is a wireless communication unit including an antenna for transmitting and receiving signals.

* * * * *